(12) United States Patent
Nonogaki et al.

(10) Patent No.: US 9,850,131 B2
(45) Date of Patent: Dec. 26, 2017

(54) METHOD FOR PRODUCING PHOSPHOR

(71) Applicant: DENKI KAGAKU KOGYO KABUSHIKI KAISHA, Tokyo (JP)

(72) Inventors: Ryozo Nonogaki, Machida (JP); Masayoshi Ichikawa, Machida (JP); Tomohiro Nomiyama, Machida (JP); Yusuke Takeda, Machida (JP)

(73) Assignee: DENKA COMPANY LIMITED, Tokyo (JP)

( * ) Notice: Subject to any disclaimer, the term of this patent is extended or adjusted under 35 U.S.C. 154(b) by 119 days.

(21) Appl. No.: 14/434,162

(22) PCT Filed: Feb. 22, 2013

(86) PCT No.: PCT/JP2013/054526
§ 371 (c)(1),
(2) Date: Apr. 8, 2015

(87) PCT Pub. No.: WO2014/057695
PCT Pub. Date: Apr. 17, 2014

(65) Prior Publication Data
US 2015/0307353 A1 Oct. 29, 2015

(30) Foreign Application Priority Data
Oct. 9, 2012 (JP) ................................ 2012-223781

(51) Int. Cl.
C09K 11/64 (2006.01)
C09K 11/77 (2006.01)
C01B 21/06 (2006.01)
C01B 21/082 (2006.01)

(52) U.S. Cl.
CPC ........ C01B 21/082 (2013.01); C01B 21/0627 (2013.01); C01B 21/0826 (2013.01); C09K 11/646 (2013.01); C09K 11/7734 (2013.01); C01P 2002/50 (2013.01); C01P 2002/72 (2013.01); C01P 2002/84 (2013.01)

(58) Field of Classification Search
CPC . C09K 11/7734; C09K 11/883; C09K 11/646; C09K 11/7774; C09K 11/7783; C09K 11/59; C09K 11/64; C01B 21/0627; C01B 21/0602; C01B 21/0821; C01B 21/068; C01B 21/082; C01P 2004/61; C01P 2004/62; Y02B 20/181
USPC ........ 252/301.4 F, 301.4 R; 264/21; 423/326
See application file for complete search history.

(56) References Cited

U.S. PATENT DOCUMENTS

| | | | |
|---|---|---|---|
| 7,476,337 B2 | 1/2009 | Sakane et al. | |
| 8,066,910 B2 | 11/2011 | Sakane et al. | |
| 8,409,470 B2 | 4/2013 | Hirosaki et al. | |
| 2006/0033083 A1 | 2/2006 | Sakane et al. | |
| 2007/0007494 A1 | 1/2007 | Hirosaki et al. | |
| 2008/0182127 A1 | 7/2008 | Oshio | |
| 2009/0085010 A1 | 4/2009 | Sakane et al. | |
| 2009/0309485 A1* | 12/2009 | Tamaki | C01B 21/0602 313/503 |
| 2010/0123104 A1 | 5/2010 | Collins et al. | |
| 2010/0301272 A1 | 12/2010 | Sakane et al. | |
| 2012/0019127 A1* | 1/2012 | Hirosaki | C09K 11/7715 313/503 |
| 2013/0140490 A1* | 6/2013 | Fujinaga | C01B 21/0602 252/301.4 F |
| 2013/0168606 A1 | 7/2013 | Hirosaki et al. | |
| 2015/0307353 A1* | 10/2015 | Nonogaki | C01B 21/0826 423/324 |

FOREIGN PATENT DOCUMENTS

| | | | |
|---|---|---|---|
| JP | 2004-071726 A | 3/2004 | |
| JP | 2005-336253 A | 12/2005 | |
| JP | 2005-336450 A | 12/2005 | |
| JP | 2006-063323 A | 3/2006 | |
| JP | 2008-127509 A | 6/2008 | |
| JP | 2008-189811 A | 8/2008 | |
| JP | WO 2012017949 A1 * | 2/2012 | ......... C01B 21/0602 |
| JP | 2012-509364 A | 4/2012 | |
| WO | WO 2005/052087 A1 | 6/2005 | |
| WO | WO 2010/056619 A1 | 5/2010 | |
| WO | WO 2010/110457 A1 | 9/2010 | |
| WO | WO 2012/017949 A1 | 2/2012 | |

OTHER PUBLICATIONS

Extended European Search Report dated May 11, 2016, for European Application No. 13846131.4.
International Search Report issued in PCT/JP2013/054526, dated Apr. 23, 2013.

* cited by examiner

Primary Examiner — Matthew E Hoban
Assistant Examiner — Lynne Edmondson
(74) Attorney, Agent, or Firm — Birch, Stewart, Kolasch & Birch, LLP

(57) ABSTRACT

Provided is a method for producing a phosphor, using a nitride raw material, that gives a high-reliability (Sr,Ca)AlSiN$_3$-based nitride phosphor at a productivity higher than before. The method comprises a mixing step of mixing raw materials and a calcining step of calcining the mixture obtained in the mixing step and, in producing the phosphor having a crystalline structure substantially identical with that of (Sr,Ca)AlSiN$_3$ crystal as the host crystal, a strontium nitride containing SrN, Sr$_2$N, or the mixture thereof as the main crystalline phase, as determined by crystalline phase analysis by powder X-ray diffractometry, and having a nitrogen content of 5 to 12 mass % is used as part of the raw materials.

3 Claims, 1 Drawing Sheet

[Fig. 1]
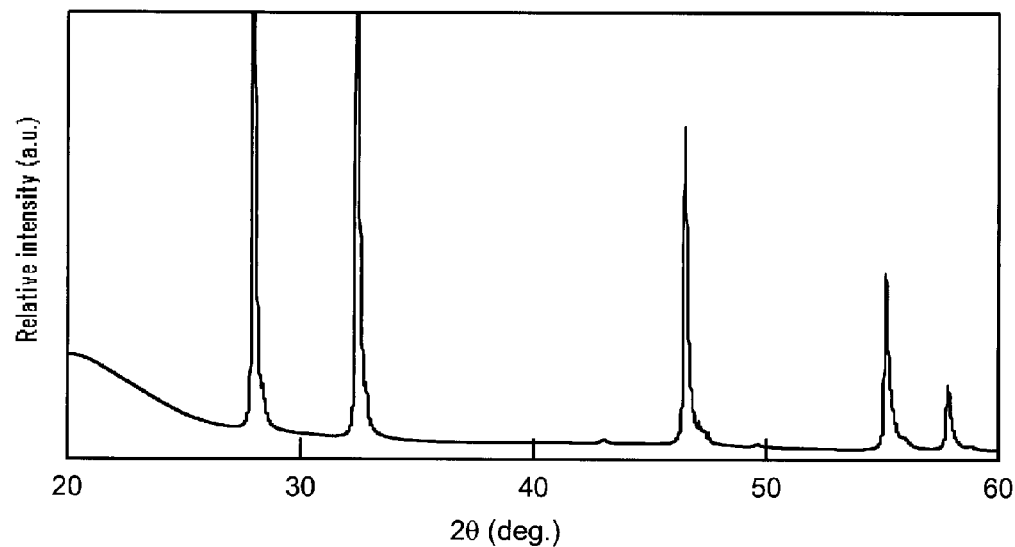
[Fig. 2]
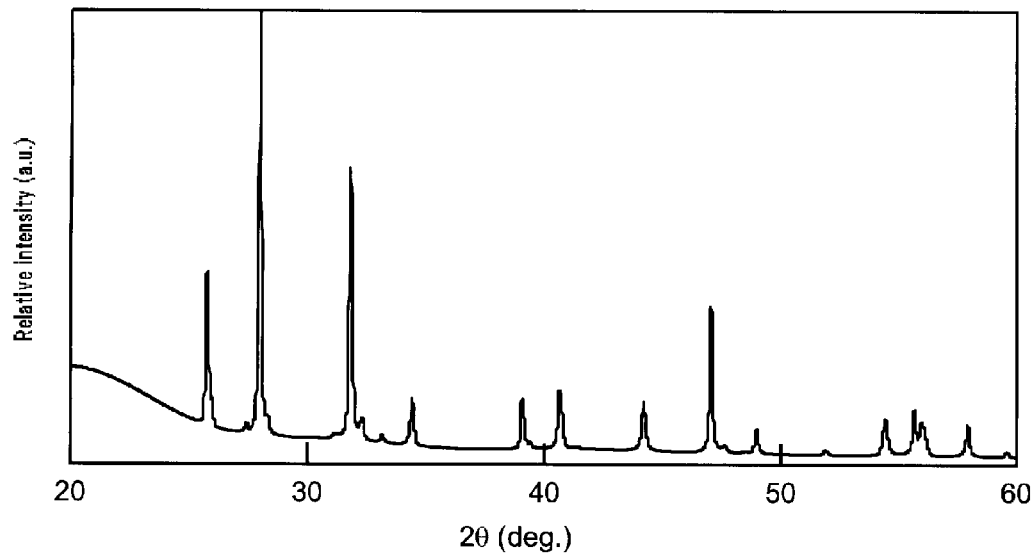

METHOD FOR PRODUCING PHOSPHOR

TECHNICAL FIELD

The present invention relates to a method for producing a phosphor. More specifically, it relates to a method for producing a phosphor that contains a host crystal having a crystal structure substantially identical with that of (Sr,Ca)AlSiN$_3$ crystal, and that absorbs light from a light-emitting device such as LED and emits red light.

BACKGROUND ART

White LEDs (light-emitting diodes) are devices that emits white light in combination of a semiconductor light-emitting device and a phosphor and a typical known example thereof is a combination of a blue LED and a YAG (Yttrium Aluminum Garnet) yellow phosphor. However, YAG phosphors, which contain a smaller amount of red light-emitting component, have problems that they are inferior in color rendering properties for use in illumination application, and lose their color reproducibility when used as a backlight for image display devices such as liquid-crystal display devices.

As a method for improving the color rendering properties of white LEDs, proposed was a method of compensating the red component by using a YAG phosphor and a red light-emitting nitride-based phosphor in combination (see Patent Document 1). It is also known that, among red light-emitting nitride-based phosphors, CaAlSiN$_3$-based nitrides or oxynitride materials that contain an inorganic compound having a crystalline structure identical with CaAlSiN$_3$ crystalline phase as the host crystal and additionally an optically active element, in particular Eu, as the emission center emit orange to red light particularly at high brightness (see Patent Document 2).

It is possible to produce the CaAlSiN$_3$-based nitride phosphor by using a mixture of the nitrides of the elements constituting the phosphor (see Patent Document 3). In the production method for a phosphor described in Patent Document 3, a phosphor is produced by mixing nitrides of the elements constituting the phosphor and calcining the mixture obtained in a calcination furnace, using nitrogen gas as the atmospheric gas.

CITATION LIST

Patent Literatures

[Patent Document 1] JP-A No. 2004-071726
[Patent Document 2] WO No. 2005/052087
[Patent Document 3] JP-A No. 2006-063323

SUMMARY OF INVENTION

Technical Problem (Sr,Ca)AlSiN$_3$-based nitride phosphors, which are obtained by substituting part of the Ca atoms in an Eu$^{2+}$-activated CaAlSiN$_3$-based nitride phosphor with Sr, emits a light having a wavelength shorter than that of the CaAlSiN$_3$-based nitride phosphors and give better visual sensitivity of the color of the emitted light. Thus, they are promising as a red phosphor for high-brightness white LEDs. However, if strontium nitride is used partially as the raw material in production of a (Sr,Ca)AlSiN$_3$-based nitride phosphor, Sr can be easily decomposed and vaporized during calcination. Thus, such a method has a problem that it is difficult to control the process during calcination and there are heterogeneous phase components such as Sr$_2$Si$_5$N$_8$ and AlN formed in the product.

Accordingly, an object of the present invention is to provide a method for producing, by using nitride raw materials, a phosphor that gives a high-reliability (Sr,Ca)AlSiN$_3$-based nitride phosphor at a productivity higher than before.

Solution to Problem

After intensive studies on the strontium nitride used partially as the raw material to solve the problems above, the inventors have found that it is possible to produce a high-reliability phosphor at high productivity by using a strontium nitride containing SrN, Sr$_2$N, or the mixture thereof as the main crystalline phase and having a nitrogen content in a particular range and made the present invention.

The method for producing a phosphor according to the present invention is a method for producing a phosphor, the host crystal thereof having a crystal structure substantially identical with that of (Sr,Ca)AlSiN$_3$ crystal, comprising a mixing step of mixing raw materials and a calcining step of calcining the mixture obtained in the mixing step, wherein a strontium nitride containing SrN, Sr$_2$N, or the mixture thereof as the main crystalline phase, as determined by crystalline phase analysis by powder X-ray diffractometry, and having a nitrogen content of 5 to 12 mass % is used as part of the raw materials.

The method for producing a phosphor according to the present invention may comprise, before the mixing step, a classifying step of reducing the maximum diameter of the strontium nitride, part of the raw material, to 300 μm or less.

A strontium nitride having an oxygen content of 0.2 to 1 mass % may be used partially as the raw material.

The raw materials for use may be a strontium nitride powder, a calcium nitride powder, a silicon nitride powder, an aluminum nitride powder, and a europium compound powder.

In the calcining step of the method for producing a phosphor according to the present invention, the raw material mixture may be calcined under a temperature condition of 1500 to 1900° C. in nitrogen atmosphere.

Effects of Invention

It is possible according to the present invention to improve the yield of production, as compared to the conventional methods of producing a (Sr,Ca)AlSiN$_3$-based nitride phosphor, and produce a high-reliability phosphor containing a smaller amount of heterogeneous phases and giving a relatively high fluorescence peak intensity.

BRIEF DESCRIPTION OF DRAWINGS

FIG. 1 is a graph showing the X-ray diffraction pattern of the strontium nitride used in Example 1.
FIG. 2 is a graph showing the X-ray diffraction pattern of the strontium nitride used in Example 2.

DESCRIPTION OF EMBODIMENTS

Hereinafter, favorable embodiments of the invention will be described in detail with reference to attached drawings.

The method for producing a phosphor in the present embodiment gives a phosphor, the host crystal thereof having a crystal structure substantially identical with that of (Sr,Ca)AlSiN$_3$ crystal, by processing at least in a mixing step of mixing the raw materials and a calcining step of calcining the mixture obtained in the mixing step. A strontium nitride containing a main crystalline phase, as determined by crystalline phase analysis by powder X-ray diffractometry, of SrN, Sr$_2$N, or the mixture thereof and having a nitrogen content of 5 to 12 mass % is then used as part of the raw materials.

[Phosphor]

The (Sr,Ca)AlSiN$_3$ crystalline phase has a skeletal structure of (Si,Al)—N$_4$ tetrahedrons bound to each other and a crystal structure containing Sr and Ca atoms located in the gap. Substitution of part of the Sr$^{2+}$ or Ca$^{2+}$ ions located in the gap of skeletal structure of the (Sr,Ca)AlSiN$_3$ crystal with Eu$^{2+}$ ions, which function as an emission center, gives a red phosphor.

An excessively low Eu content leads to reduction of the contribution thereof to emission. Alternatively an excessively high Eu content leads to concentration quenching of the phosphor by energy transfer between Eu$^{2+}$ ions. Thus, the Eu content in the raw material is preferably 0.01 to 0.3 atom %. The Eu content in the raw material is more preferably in the range of 0.04 to 0.2 atom %, and still more preferably in the range of 0.06 to 0.15 atom %.

The phosphor obtained by the production method in the present embodiment contains a trace amount of oxygen (O) as an inevitable contaminant. The compositional parameters of the phosphor, such as contents of Ca and Sr elements, Si/Al ratio, and N/O ratio, are regulated to make the phosphor retain its crystal structure and electrically neutralized as a whole.

[Strontium Nitride]

On a card in a database of X-ray diffraction pattern for use in crystal structure analysis, JCPDS (Joint Committee on Power Diffraction Standards), Sr$_2$N, SrN, SrN$_2$, and Sr$_4$N$_3$ are listed as examples of strontium nitride. The raw material is preferably a strontium nitride containing SrN, Sr$_2$N, or the mixture thereof, which are superior in stability among the various strontium nitrides, as the main crystalline phase.

Crystalline phase analysis of the strontium nitride can be performed by X-ray diffractometry. The crystal structure of a strontium nitride can be identified, for example, by comparing the X-ray diffraction pattern thereof with that on the JCPDS card described above.

The strontium nitride used as part of the raw material has a nitrogen content of 5 to 12 mass %. When the nitrogen content of the strontium nitride is less than 5 mass %, reaction heat caused by nitridization of the raw material becomes larger in the calcining step described below, because strontium nitridization is insufficient. As a result, there are produced a greater amount of aggregated bulky calcined powder, leading to deterioration of the yield during the post-calcination screening performed for classification to a suitable particle diameter or less. On the other hand, it is industrially difficult to obtain a strontium nitride having an excessively large nitrogen content and production thereof, even if possible, leads to significant increase in cost.

From the viewpoint of fluorescence intensity and others, the strontium nitride used as part of the raw material preferably has an oxygen content of 0.2 to 1 mass %. An excessively large oxygen content in the strontium nitride leads to deterioration of the fluorescence intensity of the phosphor finally obtained and it is technically difficult to obtain a strontium nitride having an extremely low oxygen content.

[Mixing Step]

In the mixing step, the raw materials are mixed, for example, by a dry mixing method or by a method of wet-mixing the raw materials in an inactive solvent that does not react substantially with the components in the raw materials and then removing the solvent. Examples of the mixing apparatuses include type-V mixers, rocking mixers, ball mills, and vibrating mills.

The raw materials for use in the mixing step are preferably a strontium nitride powder, a calcium nitride powder, a silicon nitride powder, an aluminum nitride powder, and a europium compound powder for elimination, as much as possible, of the elements other than those constituting the desired phosphor. Because strontium nitride and calcium nitride are instable in air, mixing thereof is preferably carried out in a glove box under inert atmosphere, as hydrolysis and oxidation thereof may affect the properties of the phosphor.

For production of a phosphor represented by Sr$_{0.9}$Ca$_{0.1}$AlSiN$_3$, the composition of the raw materials (element number ratio), i.e., (Sr+Ca+Eu):Al:Si, is preferably 1:1:1. The element number ratio of the (Sr,Ca)AlSiN$_3$-based nitride phosphor obtained after calcination may not be identical with its stoichiometric composition. The difference between the stoichiometric composition during mixing and the stoichiometric composition after calcination is caused by deterioration in the luminous efficiency caused by crystal defect formed during calcination. It is thus desired to adjust the composition of the raw material by estimating the change of stoichiometric composition by calcination.

[Calcining Step]

In the calcining step, the mixture obtained in the mixing step (raw material powder mixture) is placed in a calcination container. The material of the calcination container is preferably boron nitride that is stable even when heated under nitrogen environment at high temperature and less reactive with the mixture and the reaction product.

In the calcining step, it is preferable to heat the mixture under a temperature condition of 1500 to 1900° C. in a nitrogen atmosphere. An excessively low calcination temperature leads to increase of the amount of the unreacted residual, while an excessively high calcination temperature leads to decomposition of the main phase that has the crystal structure identical with that of (Sr,Ca)AlSiN$_3$. The calcination period is preferably 1 to 24 hours, for reduction of unreacted materials and for prevention of insufficient particle growth and deterioration in productivity. Although the decomposition temperature of the phosphor becomes higher when the pressure of the atmosphere in the calcining step is higher, it is preferably less than 1 MPa, when the industrial productivity is taken into consideration.

[Classifying Step]

In the method for producing a phosphor in the present embodiment, it is preferable to carry out, before the mixing step, a classifying step of reducing the maximum diameter of the strontium nitride, part of the raw material, to 300 μm or less. It is because, if strontium nitride having an excessively large particle diameter is contained in the raw material, the phosphor is prepared heterogeneously during calcination at high temperature, leading to fluctuation of fluorescence intensity and generation of heterogeneous phases. The strontium nitride is preferably classified by a method of passing it through a sieve having an opening of 300 μm or less.

[Other Steps]

The method for producing a phosphor in the present embodiment preferably comprises additionally an acid-treatment step for removal of the impurities in the phosphor produced and an annealing step for improvement of crystallinity.

The method for producing a phosphor in the present embodiment, which uses a strontium nitride containing SrN, Sr$_2$N, or the mixture thereof as the main crystalline phase and having a nitrogen content of 5 to 12 mass %, suppresses favorably the reaction heat by nitridization of the raw materials and reduces generation of aggregated bulky calcined powder. Thus, it gives a phosphor suitable for use in LED having a particle diameter in the range of 5 to 30 μm. The particle diameter of the phosphor can be controlled more effectively by crushing, pulverization, or classification.

The crystalline phase present in the phosphor is preferably a single crystalline phase with fewer heterogeneous phase. Specifically, the content of heterogeneous-phase crystal is preferably 10 mass % or less. The content of heterogeneous phase (mass %) can be determined from the diffraction intensity of the other crystalline phases relative to the maximum diffraction intensity of the crystalline phase in analysis by powder X-ray diffractometry. The method for producing a phosphor in the present embodiment gives a phosphor containing $Sr_2Si_5N_8$ and AlN, which are heterogeneous phases identified by Rietveld analysis using a X-ray diffraction apparatus, respectively in an amount by mass of 10 mass % or less.

The phosphor obtained by the production method in the present embodiment can be used in light-emitting devices having a light source and a phosphor. As the phosphor shows an emission characteristic having a fluorescence peak at a wavelength of 620 to 650 nm, when irradiated with a UV or visible light having a wavelength of 350 to 500 nm as the excitation source, it is possible to obtain white light in combination with a light source such as ultraviolet LED or blue LED or, additionally as needed, in combination with a green to yellow phosphor and/or a blue phosphor.

Because the phosphor obtained by the production method in the present embodiment has a crystal structure substantially identical with that of the $(Sr,Ca)AlSiN_3$ crystalline phase that is superior in stability, it is resistant to deterioration in brightness at high temperature and degradation when exposed to high temperature and superior in heat resistance and long-term stability under oxidative atmosphere and humid environment. Thus, a light-emitting device containing the phosphor is resistant to deterioration in brightness and color change and gives high brightness and longer life.

EXAMPLES

Hereinafter, effects of the present invention will be described with reference to Examples and Comparative Examples of the present invention. In the Examples below, phosphors of Examples and Comparative Examples were prepared, using strontium nitrides different in main crystalline phase or nitrogen content, and the properties thereof were examined.

Example 1

<Preparation of Strontium Nitride>

Metal strontium (38-0074 grade, purity: 99.9%, produced by Strem Chemicals Inc.) was placed in an alumina boat in a glove box under nitrogen-substituted atmosphere; the alumina boat was placed in a quartz pipe; both ends of the quartz pipe were sealed; and the quartz pipe having the metal strontium therein was withdrawn from the glove box. The quartz pipe was placed in a solenoidal furnace; nitrogen gas pipes were connected to the quartz pipe; and the quartz pipe and the nitrogen gas lines were evacuated under vacuum.

Nitrogen gas was introduced into the quartz pipe; metal strontium was heated to 600° C. under nitrogen flow and held at the same temperature for 3 hours, heated to 850° C. and held at the same temperature for 1 hours, and cooled. Both ends of the quartz pipe were sealed, the strontium nitride obtained was collected in a glove box, and the product was screened with a sieve having an opening of 290 μm, to give the strontium nitride desired.

<Analysis of Crystalline Phase>

The strontium nitride obtained was subjected to powder X-ray diffraction with CuKα X-rays on a X-ray diffraction apparatus (Ultima IV, manufactured by Rigaku Corporation). The X-ray diffraction pattern obtained is shown in FIG. 1. The X-ray diffraction pattern shown in FIG. 1 was compared with that in the JCPDS card, showing that the powder has the crystalline phase identical with SrN crystalline phase.

<Analysis of Nitrogen and Oxygen Contents>

The nitrogen and oxygen contents in strontium nitride were determined on an oxygen nitrogen analyzer (EMGA-920, manufactured by Horiba, Ltd.) The nitrogen content was found to be 11.0 mass % and the oxygen content was found to be 0.23 mass %.

<Preparation of Phosphor>

(1) Mixing Step

Raw materials used were an α-silicon nitride powder (produced by Ube Industries, Ltd., SN-E10 grade, oxygen content 1.0 mass %): 52.2 mass %, an aluminum nitride powder (produced by Tokuyama Corporation, E grade, oxygen content: 0.8 mass %): 45.8 mass %, and europium oxide (produced by Shin-Etsu Chemical Co., Ltd., RU grade): 2.0 mass %. The raw materials were mixed in a ball mill, as ethanol was used as the solvent. During the ball mill mixing, a nylon pot and silicon nitride balls were used. After the ball mill mixing, the solvent was removed by drying, and the product was screened with a sieve having an opening of 75 μm for removal of aggregates.

The raw materials mixed and classified, the strontium nitride prepared by the method described above, and a calcium nitride powder (produced by Materion Corporation, purity: 99%, particle diameter: 75 μm or less, oxygen content: 0.6 mass %) were transferred into a glove box under nitrogen-substituted atmosphere and mixed with a mortar. The blending ratio, powder mixture:strontium nitride:calcium nitride, then was 49.5 mass %:47.8 mass %:2.7 mass %.

(2) Calcining Step

The mixture obtained after mixing in the mortar was filled in a glove box into a cylindrical boron nitride container (produced by DENKI KAGAKU KOGYO KABUSHIKI KAISHA, N-1 grade) with a cap; the container was withdrawn from the glove box and placed in an electric furnace with carbon heater and the electric furnace was vacuum-evacuated sufficiently to a pressure of 0.1 Pa or less. The mixture was heated as the container was held vacuum-evacuated; nitrogen gas was introduced when the temperature reached 600° C., and the atmospheric pressure in the furnace was adjusted to 0.9 MPa. The mixture was heated further to 1800° C. after introduction of the nitrogen gas and calcined at 1800° C. for 4 hours, to give a phosphor.

After termination of power supply to the electric furnace, the phosphor obtained was cooled to normal temperature. The phosphor cooled to normal temperature was crushed in a ball mill and the powder passing a vibration sieve having an opening of 45 μm was fractionated. The yield during classification was 98 mass %. The phosphor after classification was washed with water and finer particles were removed by additional classification.

<Examination of Phosphor Properties>

The fluorescence properties of the phosphors of Examples and Comparative Examples are shown in Table 1 and will be described below.

(1) Heterogeneous Phase $Sr_2Si_5N_8$ and AlN are heterogeneous phases of the phosphor to be produced, i.e., $(Sr,Ca)AlSiN_3$ crystalline phase, and the amounts by mass of $Sr_2Si_5N_8$ and AlN were determined by Rietveld analysis on a X-ray diffraction apparatus. The amount of each of the heterogeneous phases is preferably 10 mass % or less.

(2) Relative Fluorescence Peak Intensity

The relative fluorescence peak intensity was determined as a relative value to 100% of the peak intensity of the phosphor of Comparative Example 1 described below, using the peak intensity in fluorescence spectrum as the indicator. The fluorescence was measured on a spectrofluoro-photometer (F-7000, manufactured by Hitachi High-Technologies Corporation) that was previously calibrated with rhodamine B and a secondary standard light source. The solid sample holder attached to the photometer was used for measurement and the fluorescence spectrum at an excitation wavelength of 455 nm was determined. The phosphor of Example 1 showed the peak wavelength of 630 nm in its fluorescence spectrum and had a half value width of 87 nm.

The peak intensity of the phosphors of Examples 2 to 9 and Comparative Example 1 described below was determined by the sampling method and the condition identical with those of Example 1.

Example 2

A phosphor was prepared using a strontium nitride powder obtained by a method similar to that in Example 1, except that, under the condition of nitriding the metal strontium in Example 1, the metal strontium was heated to about 600° C. under nitrogen flow and held at the same temperature for about 3 hours and cooled without the step of heating it to 850° C. The X-ray diffraction pattern of the strontium nitride used in Example 2 is shown in FIG. 2. The X-ray diffraction pattern shown in FIG. 2 was compared with that on the JCPDS card, showing that the crystalline phase thereof was identical with that of $Sr_2N$ crystalline phase.

The phosphor of Example 2 had a nitrogen content of strontium nitride smaller than that of Example 1, but the fluorescence peak intensity of the phosphor obtained was mostly equivalent to that of Example 1 and contamination of heterogeneous phase components was also smaller.

Example 3

A phosphor was prepared by a method similar to that in Example 1, using a mixed powder of SrN and $Sr_2N$ crystalline phases obtained by mixing the strontium nitride used in Example 1 and the strontium nitride used in Example 2 in the same amount. The phosphor of Example 3 had a fluorescence peak intensity mostly equivalent to that of Example 1 and contamination of the heterogeneous phase components was also smaller.

Example 4

A phosphor was prepared by a method similar to that in Example 1, except that the metal strontium in Example 1 was screened with a sieve having an opening of 77 μm after nitridization. The phosphor of Example 4 had an oxygen content of strontium nitride larger than that of Example 1, but the fluorescence peak intensity of the phosphor obtained was controlled to 10% or less smaller than that of Example 1 and contamination of heterogeneous phase components was also smaller.

Example 5

A phosphor was prepared by a method similar to that in Example 1, except that the calcination temperature in Example 1 was changed from 1800° C. to 1500° C. The phosphor of Example 5 had an oxygen content of strontium nitride larger than that of Example 1, but the fluorescence peak intensity was controlled to 10% or less smaller than that of Example 1 and contamination of the heterogeneous phase components was also smaller at 10% or less.

Comparative Example 1

A phosphor was prepared by a method similar to that in Example 1, except that, under the condition for nitriding metal strontium in Example 1, the metal strontium was heated to about 450° C. and held at the same temperature for 3 hours under nitrogen flow and then cooled. The nitrogen content of the strontium nitride used then was a low value of 3.3 mass %.

Because nitridization for synthesis of the strontium nitride was insufficient, the phosphor of Comparative Example 1 generated large reaction heat by nitridization during calcination and gave a large amount of aggregated bulky calcined powder, thus leading to significant drop in screening yield after calcination, as compared with that in Example 1.

Example 6

A phosphor was prepared by a method similar to that in Example 1, except that the metal strontium of Example 1 was screened with a sieve having an opening of 630 μm after nitridization. The phosphor of Example 6 had a post-calcination screening yield of 90% or more, as compared to that in Example 1, but contained the $Sr_2Si_5N_8$ phase, a heterogeneous phase component after calcination, in an amount of more than 10 mass %. It is probably because, as the strontium nitride powder had a particle diameter of more than 300 μm, the synthesis reaction for preparation of the phosphor became heterogeneous during calcination at high temperature.

Example 7

A phosphor was prepared by a method similar to that in Example 1, except that the metal strontium of Example 1 was screened with a sieve having an opening of 45 μm after nitridization. As the oxygen content of the strontium nitride was more than 1 mass %, the phosphor of Example 7 had a post-calcination screening yield of 90% or more, but the phosphor obtained gave a fluorescence peak intensity 15% smaller than that of Example 1.

Examples 8 and 9

In Example 8, the calcination temperature in Example 1 was changed from 1800° C. to 1450° C., while, in Example 9, the calcination temperature was changed to 1950° C. Both of the phosphors of Examples 8 and 9 gave a post-calcination screening yield of 90% or more. However, the phosphor of Example 8 gave a fluorescence peak intensity 20% or more smaller than that of Example 1. It is probably because the phosphor was less crystalline, as the calcination temperature was too low.

The phosphor of Example 9 contained $Sr_2Si_5N_8$ and AlN, heterogeneous phase components, respectively in an amount of more than 10 mass %. It is probably because the (Sr,Ca)AlSiN$_3$ crystalline phase had decomposed, as the calcination temperature was too high.

Properties of the strontium nitrides used in Examples 1 to 9 and Comparative Example 1 described above, calcination temperature and properties of the phosphors obtained therefrom are summarized in the following Table 1.

TABLE 1

| | Strontium nitride | | | | Calcination | | Phosphor properties | | |
|---|---|---|---|---|---|---|---|---|---|
| | Sieve opening (μm) | Crystalline phase | Nitrogen content (mass %) | Oxygen content (mass %) | Calcination temperature (° C.) | Sieve opening: 45 μm yield (%) | Heterogeneous phase | | Relative fluorescence peak intensity (%) |
| | | | | | | | $Sr_2Si_5N_8$ (mass %) | AlN (mass %) | |
| Example 1 | 290 | SrN | 11.0 | 0.23 | 1800 | 98 | 5.1 | 4.0 | 111 |
| Example 2 | 290 | $Sr_2N$ | 5.0 | 0.41 | 1800 | 90 | 4.0 | 3.3 | 108 |
| Example 3 | 290 | SrN, $Sr_2N$ | 8.0 | 0.38 | 1800 | 98 | 5.3 | 5.1 | 109 |
| Example 4 | 77 | SrN | 6.5 | 0.95 | 1800 | 92 | 6.9 | 5.3 | 102 |
| Example 5 | 290 | SrN | 11.0 | 0.23 | 1500 | 99 | 8.0 | 6.9 | 101 |
| Example 6 | 630 | SrN | 10.0 | 0.21 | 1800 | 94 | 12.0 | 9.0 | 102 |
| Example 7 | 45 | SrN | 11.6 | 1.58 | 1800 | 95 | 6.0 | 4.9 | 94 |
| Example 8 | 290 | SrN | 11.0 | 0.23 | 1450 | 99 | 8.6 | 9.9 | 78 |
| Example 9 | 290 | SrN | 11.0 | 0.23 | 1950 | 91 | 18.6 | 10.4 | 96 |
| Comparative Example 1 | 290 | $Sr_2N$ | 3.3 | 0.80 | 1800 | 66 | 3.0 | 5.3 | 100 |

As shown in Table 1, the post calcination screening yield was significantly lower in Examples 1 to 5 than in Comparative Example 1, as the raw material strontium nitride had a nitrogen content controlled to 5 to 12 mass %. The phosphors of Examples 1 to 5 had a fluorescence peak intensity higher than that of the phosphor of Comparative Example 1.

The post-calcination screening yield was 90% or more and the productivity was better in Examples 6 to 9, but, when Examples 1 and 6 are compared with each other, Example 1, wherein a strontium nitride screened with a sieve having an opening of 300 μm or less was used, was more effective in reducing the heterogeneous phase content than Example 6. When Examples 1 and 7 are compared with each other, a red phosphor higher in luminous efficiency than that of Example 7 was obtained in Example 1, wherein the strontium nitride had an oxygen content controlled to 0.2 to 1 mass %. Further when Examples 1, 8, and 9 are compared with one another, Example 1, wherein the calcination temperature was controlled to 1500 to 1900° C., was more effective in reducing heterogeneous phase content than Examples 8 and 9 and gave a red phosphor superior in luminous efficiency.

It is possible according to the present invention to produce a high-reliability $(Sr,Ca)AlSiN_3$-based nitride phosphor at a productivity higher than before.

The invention claimed is:

1. A method for producing a phosphor, the host crystal thereof having a crystal structure substantially identical with that of $(Sr,Ca)AlSiN_3$ crystal, comprising:
    a mixing step of mixing raw materials; and
    a calcining step of calcining the mixture of the mixed raw materials under a temperature condition of 1500 to 1900° C. in nitrogen atmosphere, wherein
    the raw materials contain a strontium nitride powder,
    the strontium nitride powder has a nitrogen content of 5 to 12 mass %, an oxygen content of 0.2 to 1 mass %, and a maximum diameter of 77 to 300 μm, and
    the strontium nitride powder comprises SrN, $Sr_2N$, or the mixture thereof as determined by crystalline phase analysis by powder X-ray diffractometry.

2. The method for producing a phosphor according to claim 1, further comprising, before the mixing step, a classifying step of reducing the maximum diameter of the strontium nitride, part of the raw material, to 300 μm or less.

3. The method for producing a phosphor according to claim 1, wherein the raw materials, further comprise a calcium nitride powder, a silicon nitride powder, an aluminum nitride powder, and a europium compound powder.

* * * * *